United States Patent
Korn

(10) Patent No.: US 10,208,788 B2
(45) Date of Patent: Feb. 19, 2019

(54) INTAKE DEVICE WITH FLAP BEARING ARRANGEMENT AND FLAP BEARING ARRANGEMENT

(71) Applicant: MANN+HUMMEL GMBH, Ludwigsburg (DE)

(72) Inventor: Alexander Korn, Gueglingen (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 167 days.

(21) Appl. No.: 15/061,084

(22) Filed: Mar. 4, 2016

(65) Prior Publication Data

US 2016/0258484 A1 Sep. 8, 2016

(30) Foreign Application Priority Data

Mar. 6, 2015 (DE) .................. 10 2015 002 799

(51) Int. Cl.
*F16C 11/04* (2006.01)
*F02M 35/10* (2006.01)
*F02B 31/06* (2006.01)
*F16C 13/02* (2006.01)

(52) U.S. Cl.
CPC ............ *F16C 11/045* (2013.01); *F02B 31/06* (2013.01); *F02M 35/10255* (2013.01); *F16C 13/022* (2013.01); *F16C 2360/22* (2013.01); *Y02T 10/146* (2013.01)

(58) Field of Classification Search
CPC .. F16C 11/045; F16C 13/022; F16C 2360/22; F02B 31/06; F02M 35/10255; Y02T 10/146

USPC ......................................................... 123/434
See application file for complete search history.

(56) References Cited

U.S. PATENT DOCUMENTS

| 4,438,991 | A  | * | 3/1984 | Lundgren | F16C 35/042 |
|---|---|---|---|---|---|
|   |   |   |   |   | 384/537 |
| 6,565,408 | B1 | * | 5/2003 | Marcantonio | A63H 1/30 |
|   |   |   |   |   | 446/247 |
| 7,162,997 | B2 |   | 1/2007 | Madeira |   |
| 7,419,417 | B1 | * | 9/2008 | VanKuiken | A63H 1/30 |
|   |   |   |   |   | 446/250 |
| 7,886,713 | B2 | * | 2/2011 | Vichinsky | F02D 9/107 |
|   |   |   |   |   | 123/188.14 |
| 2012/0079901 | A1 | * | 4/2012 | Shu | F15B 15/068 |
|   |   |   |   |   | 74/89.14 |

(Continued)

FOREIGN PATENT DOCUMENTS

| DE | 202006007545 U1 | 9/2007 |
|---|---|---|
| DE | 202006019638 U1 | 4/2008 |

(Continued)

OTHER PUBLICATIONS

IGUS GMBH; Automotive Brochure; 2014; pp. 16-17 and 20-21; MAT0070819.25 Issue Sep. 2011; Cologne Germany.

*Primary Examiner* — Joseph Dallo
*Assistant Examiner* — Yi-Kai Wang
(74) *Attorney, Agent, or Firm* — James Hasselbeck

(57) ABSTRACT

Disclosed is a flap bearing arrangement (10), having a bearing mount (20) with two side parts (24) connected by means of a tube section (22), between which is arranged an O-ring (30) which surrounds the tube section (22). Also disclosed is a flap bearing arrangement (100) for an intake device (200) having a flap shaft (100).

6 Claims, 4 Drawing Sheets

(56) References Cited

U.S. PATENT DOCUMENTS

| | | | |
|---|---|---|---|
| 2014/0105527 A1* | 4/2014 | Thoma | F04B 53/144 384/130 |
| 2014/0177992 A1* | 6/2014 | Schaefers | F16C 33/7809 384/486 |
| 2015/0252733 A1* | 9/2015 | Oiwa | F02B 27/0263 123/337 |
| 2015/0330340 A1* | 11/2015 | Oiwa | F02B 27/0215 123/184.38 |

FOREIGN PATENT DOCUMENTS

| | | |
|---|---|---|
| DE | 102009050242 B4 | 12/2013 |
| JP | 2003322165 A | 11/2003 |

* cited by examiner

— INTAKE DEVICE WITH FLAP BEARING ARRANGEMENT AND FLAP BEARING ARRANGEMENT

TECHNICAL FIELD

The invention relates to a flap bearing arrangement for a charge air intake device, particularly of an internal combustion engine, and to an intake device having a flap bearing arrangement for an internal combustion engine.

BACKGROUND

A charge air intake device is known from U.S. Pat. No. 7,886,713 B2, wherein the charge air flaps are not directly mounted on the base body of the device, but rather by means of O-rings mounted on bearing bushings. The O-rings are inserted into semi-circular bearing recesses in the base body, filling in the same with their outer circumference. The O-rings serve to compensate for tolerances, and damper vibrations during the operation of the intake device.

SUMMARY

One problem addressed by the invention is that of creating an improved flap bearing arrangement which can be installed easily, particularly for a charge air intake device of an internal combustion engine.

A further problem addressed by the invention is that of providing an improved intake device having such a flap bearing arrangement.

The problems named above are addressed according to one aspect of the invention by a flap bearing arrangement, wherein an O-ring is arranged on a bearing mount having side parts, and according to another aspect of the invention by an intake device which has at least one such flap bearing arrangement.

A flap bearing arrangement is suggested which has a bearing mount with two side parts connected by means of a tube section, between which is arranged an O-ring which surrounds the tube section.

The flap bearing arrangement, which is particularly intended for charge motion valves in the intake line of a charge air intake device of an internal combustion engine, does not sit directly in the base body of the intake device. Rather, it is held in the base body via the O-ring. The O-ring enables more generous tolerances of the bearing area, which can be compensated by this O-ring, dampers pulsations during operation of the flap bearing arrangement, and improves the wear behavior of the flap bearing arrangement.

A further advantage of the flap bearing arrangement having an O-ring is particularly in mechanically overdetermined systems, such as in the case of a mounting of a shaft with more than two bearing points, and particularly in the case of two bearing points per flap with multiple flaps on a shaft, wherein it is possible to compensate for tolerances in an orientation of the flap bearing arrangements which is not precisely coaxial. The bearing arrangements have a floating mount due to the O-rings arranged on the flap bearing arrangement. The bearing mounts orient themselves in an optimized position such that the friction of the shaft in the bearing point is minimized.

The bearing mount enables a simple installation of the flap bearing arrangement, because it is not necessary to perform the installation in the correct positional arrangement. The side parts furthermore enable a simple axial positioning and good handling of the flap bearing arrangement. The side parts are advantageously configured with parallel contact surfaces perpendicular to the axis of the bearing mount. The cross-section of the side parts perpendicular to the axis can in principle be any arbitrary shape—for example round or rectangular.

The flap bearing arrangement is suitable for all types of flaps which are arranged in intake devices close to the cylinder head of an internal combustion engine, such as swirl flaps, tumble flaps, and the like.

According to one favorable design, the side parts can have a substantially rectangular cross-section perpendicular to the tube section—preferably a square cross-section. The edges of the side parts being parallel in pairs makes it possible to install the bearing mounts in a particularly simple manner. For easier handling, the corners of the rectangular cross-section can be rounded off.

According to one favorable design, the O-ring can project beyond the side parts perpendicular to the tube section only sectionally. The contact in the bearing area of the base body can then be in points or in sections such that it is possible to compensate for tolerances in the bearing area.

According to one favorable design, the O-ring can project beyond the side parts perpendicular to the tube section by no more than 50% of its ring diameter. During operation, the side parts in matching recesses in the base body can stabilize the flap bearing arrangement when the flaps pivot.

According to one favorable design, a cylinder support which projects outward axially is arranged on the outer side of each side part. This cylinder support can be used to axially support the bearing, for the purpose of better positioning in the bearing point.

According to one favorable design, the bearing mount can be formed by the plain bearing material polyphenylene sulfide (PPS). The high-quality plain bearing material provides long service life for the flap bearing arrangement.

According to one favorable design, the O-ring can be formed from an elastomer. In principle, all conventional materials for O-rings can be considered, including viton or the like, for example. The material can be selected to match the conditions of use, such as temperature, wear conditions, etc.

According to a further aspect of the invention, a flap shaft is suggested which has at least one flap bearing arrangement, wherein the flap bearing arrangement has a bearing mount with two side parts connected by means of a tube section, between which is arranged an O-ring which surrounds the tube section. The side parts can have a rectangular cross-section perpendicular to the tube section—preferably a square cross-section. The O-ring can project beyond the side parts perpendicular to the tube section only sectionally, at most by 50% of its ring diameter. A cylinder support which projects outward axially can be arranged on the outer side of each side part, serving the purpose of supporting the bearing axially.

According to a further aspect of the invention, an intake device is suggested which has a flap shaft with at least one flap bearing arrangement, wherein the flap bearing arrangement has a bearing mount with two side parts connected by means of a tube section, between which is arranged an O-ring which surrounds the tube section.

According to one favorable design, the flap shaft can be arranged between an upper part and a lower part which are fixed to each other, particularly by welding—for example by means of hot gas welding. The upper part and the lower part can be formed from a suitable plastic.

BRIEF DESCRIPTION OF THE DRAWINGS

Additional advantages are found in the following description of the drawings, in which embodiments of the invention are illustrated. The drawings, the description, and the claims contain numerous features in combination. A person skilled in the art will also contemplate the features individually to arrive at further practical combinations.

In the drawings, by way of example

DETAILED DESCRIPTION

Identical or similar components in the figures are indicated by the same reference numbers. The figures only show examples and should not be understood as restrictive.

Figure 1:
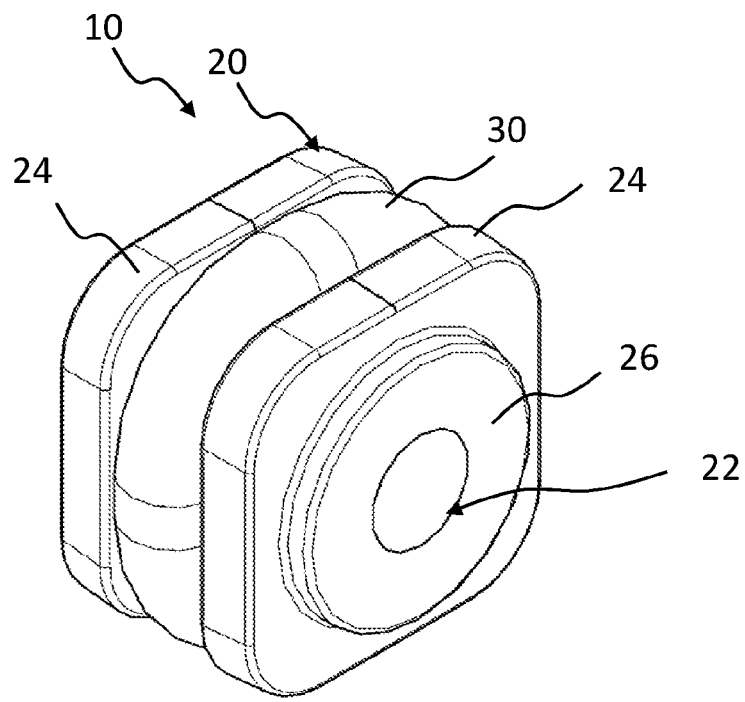
FIG. 1 shows an isometric view of a flap bearing arrangement according to one embodiment of the invention.

FIG. 1 shows an isometric view of a flap bearing arrangement 10 according to one embodiment of the invention. The flap bearing arrangement 10 has a bearing mount 20 with two side parts 24 connected by means of a tube section 22, between which is arranged an O-ring 30 which surrounds the tube section 22. One cylinder support 26 which projects outward axially is arranged on the outer side of each side part 24 concentrically to the tube section 22. The side parts 24 have a square cross-section perpendicular to the tube section 22, with rounded corners.

The O-ring 30 in this case projects beyond the side parts 24 perpendicular to the tube section 22 only sectionally, particularly near the side edges, while at the corners of the side parts 24, the side parts 24 project beyond the O-ring 30. The O-ring 30 projects only slightly beyond the side edges of the side parts 24—at most by 50% of its ring diameter.

The bearing mount 20 particularly is made of PPS, and the O-ring 30 is made of a suitable elastomer. The bearing mount 20 has an advantageous, single-piece construction.

Figure 2:
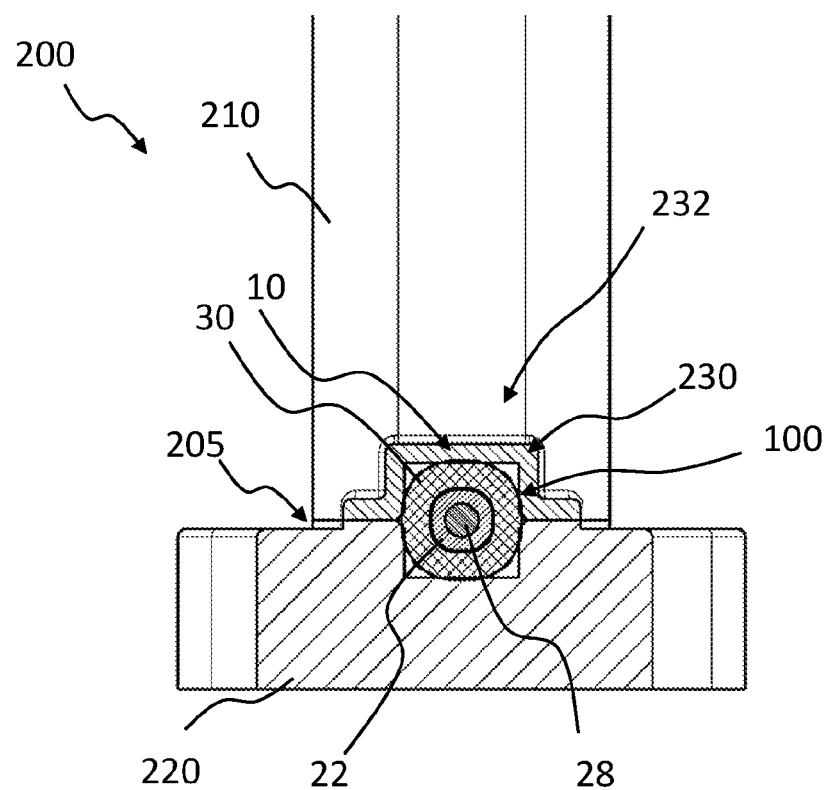
FIG. 2 shows a cross-section of an intake device with the upper part, lower part, and flap shaft, according to one embodiment of the invention.

As shown in FIG. 2 in a cross-section of an exemplary intake device 200, the O-ring 30 only contacts its bearing point 232 in certain areas such that there is no need for the bearing point 232 to be matched to the shape of the O-ring 30. At the same time, the boundaries of the bearing point 232 and the side parts 24 (FIG. 1) ensure a secure chambering of the O-ring 30.

The intake device 200 shown has an upper part 210 with air ducts, a lower part 220, and a flap shaft 100. The flap shaft 100 is covered by a duct cover 230 which is arranged in the upper part 210 centrally with respect to the narrow side of the intake device 200. The upper part 210 and the lower part 220 are connected by means of a welded seam. The actuator which operates the flap shaft is not illustrated. The angular position of the flaps can be changed by an electric actuator or a vacuum actuator.

The cross-section is rendered through the center of a bearing mount 10. For this reason, the side parts are not visible. A shaft 28 which pivots charge motion valves (not illustrated), which are arranged on the flap shaft 100, is guided through the tube section 22. The charge motion valves in the intake tube/valve flange are held in the base body via the flap bearing arrangement 10. The O-rings 30 in the bearing mounts 20 produce a potential compensation for tolerances in the bearing points 232, thereby making it possible to ensure there is no play. The absence of play is necessary, because increased wear results from the intake air creating pulsations otherwise.

Figure 3:
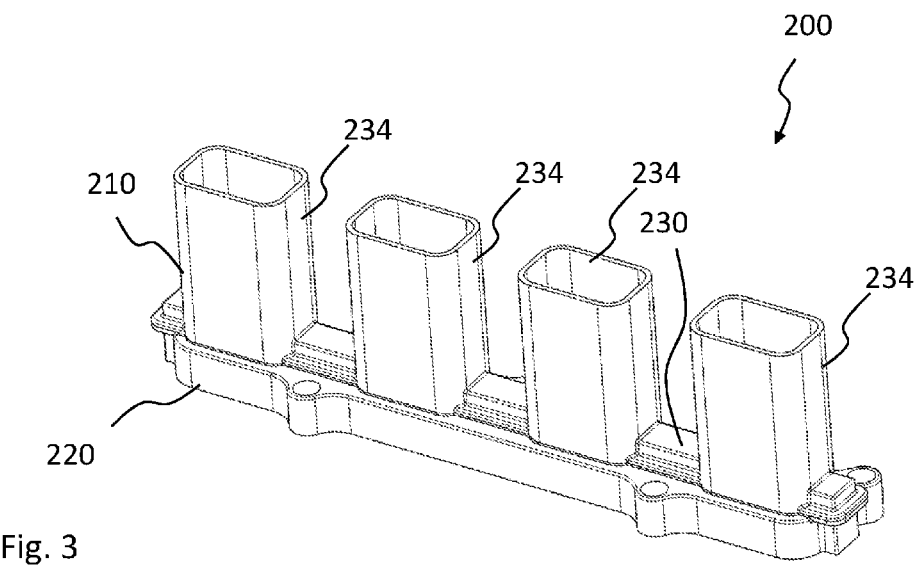
FIG. 3 shows an isometric view of an intake device with swirl flaps, according to one embodiment of the invention.
Figure 4:
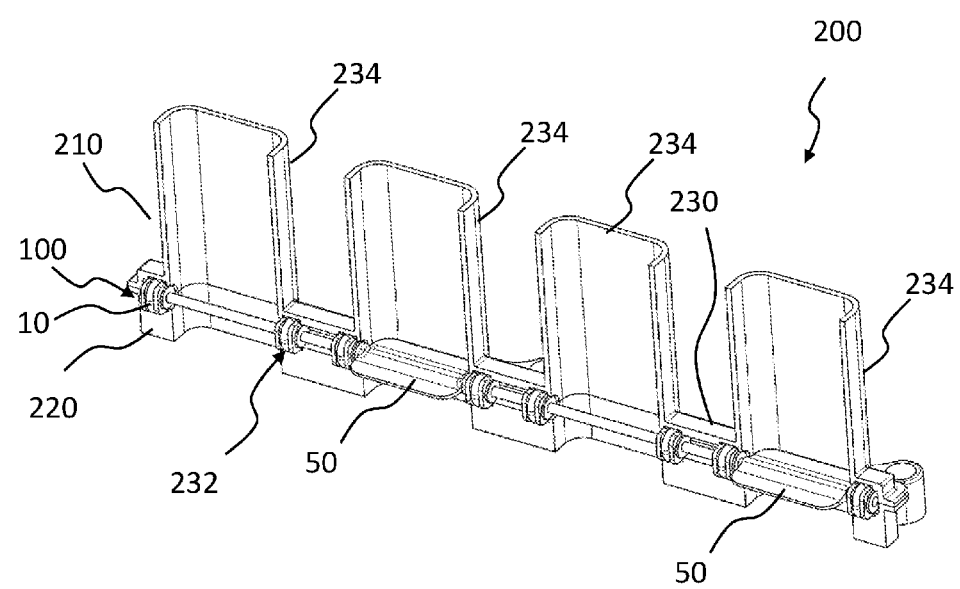
FIG. 4 shows a cutaway view of the Intake device in FIG. 3.

The intake device 200 corresponds to a device with swirl valves, as illustrated in FIGS. 3 and 4. FIG. 3 shows an isometric view of intake device 200 according to one embodiment of the invention, and FIG. 4 shows a cutaway view through the intake device 200 in FIG. 3, with swirl valves 50.

The upper part 210 has, in addition to the duct concavity 230, air ducts 234. An air supply or a plenum (not illustrated) can be connected to the free end thereof. This configuration can also be constructed as a component, or have a conventional multi-shell construction.

Openings are included on the lower part 220 underneath the flap shaft 100, wherein, when assembled, air can flow through the same into the cylinder of an internal combustion engine. In this case, pairs of adjacent air ducts 234 are functionally assigned to one cylinder. Only every second air duct 234 has a swirl valve 50, such that every other air duct 234 is open—for example during partial load operation of the internal combustion engine—while the other duct can be connected, for example, for full load operation. The always-open partial load air duct 234 produces a defined flow behavior of the intake air which directs a swirl about the vertical axis, thereby influencing the combustion characteristics in the cylinder.

During the manufacturing process, the bearing mounts 10 (for clarity, only one is included in the drawing) of the flap shaft 100 can be easily inserted in the lower part 210, and allow a tolerance in the bearing area 232 (only one is shown, by way of example) due to the O-rings of the bearing mounts 10, and easy axial positioning due to the side parts of the bearing mount 10. Afterward, the upper part 210 is placed on the lower part 220 and connected to the same.

Figure 5:
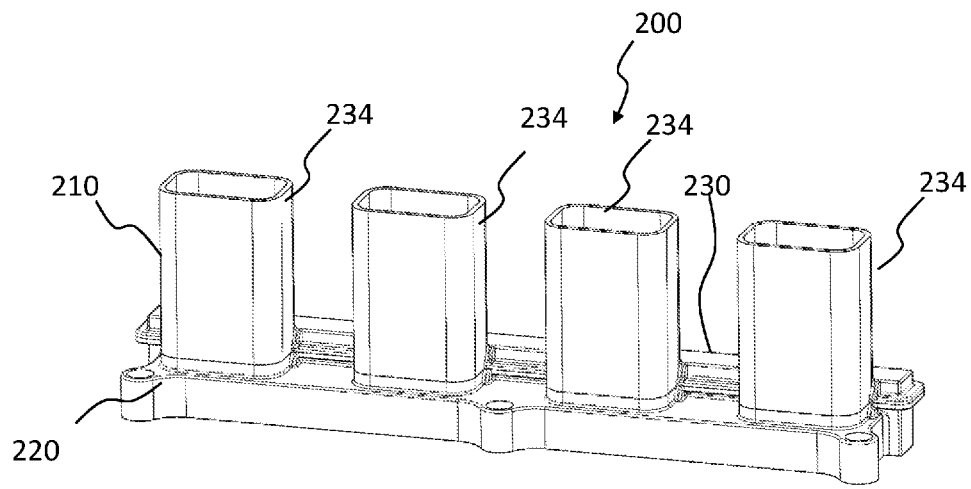
FIG. 5 shows an isometric view of an intake device with tumble flaps, according to one embodiment of the invention.
Figure 6:
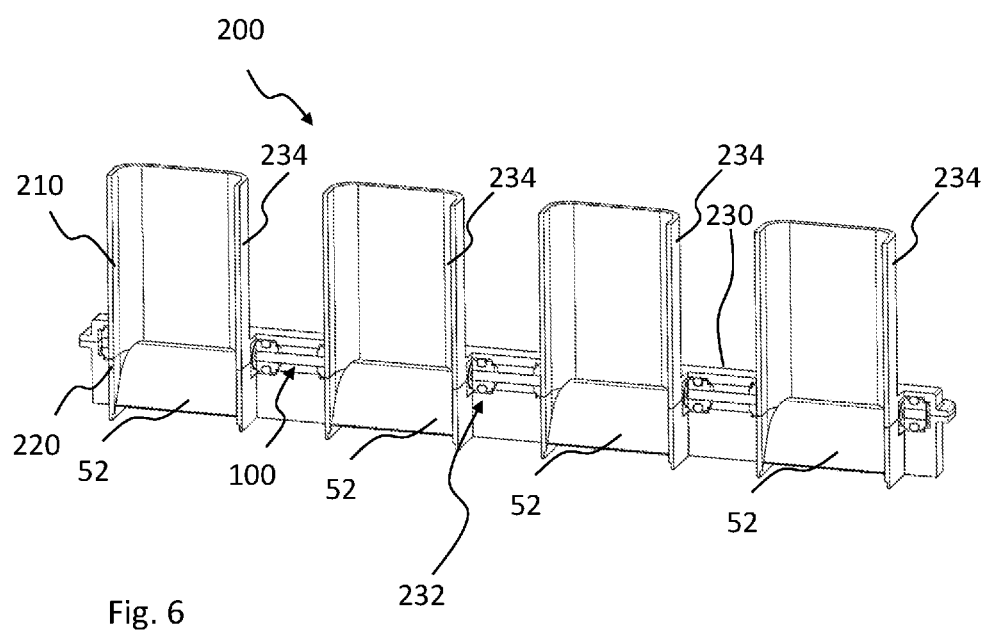
FIG. 6 shows a cutaway view of the Intake device in FIG. 5.
Figure 7:
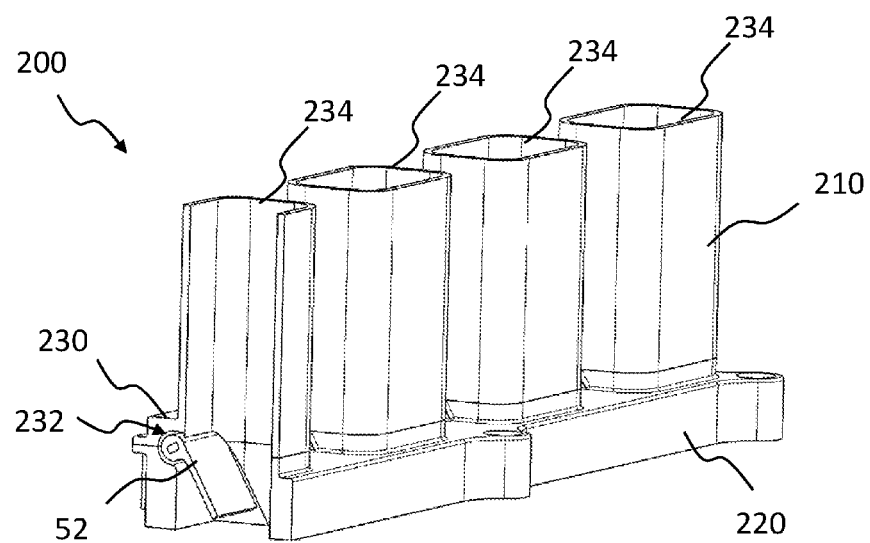
FIG. 7 shows a partial cutaway view of the Intake device in FIG. 5.

FIGS. 5 to 7 show an intake device 200, having so-called tumble flaps 52. FIG. 5 shows an isometric view of an intake device 200, having so-called tumble flaps 52, according to one embodiment of the invention, and FIG. 6 shows a cutaway view of the intake device 200 in FIG. 5. FIG. 7 shows a partial cutaway view of the intake device in FIG. 5.

The duct concavity 230 is arranged off-center on the edge of the upper part 210, next to the air ducts 234. An air supply or a plenum (not illustrated) can be connected to the free end thereof. This configuration can also be constructed as a component, or have a conventional multi-shell construction.

Openings are included on the lower part 220 underneath the flap shaft 100, wherein, when assembled, air can flow through the same into the cylinder of an internal combustion engine. In this case, each air duct 234 is functionally assigned to one cylinder. Air flowing into the cylinder rotates about a transverse axis and thereby influences the combustion process in the cylinder.

Figure 8:
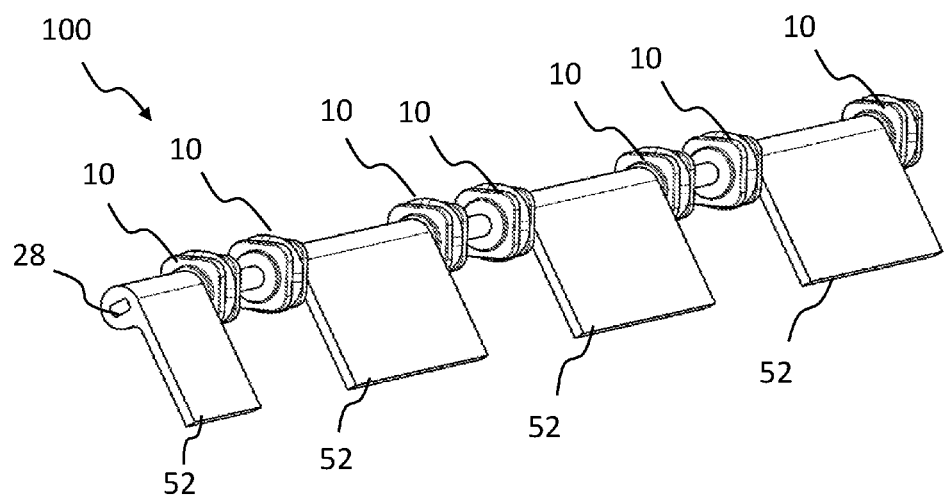
FIG. 8 shows a partial cutaway view of the flap shaft of the intake device in FIG. 5.

FIG. 8 shows a partial cutaway view of a flap shaft 100 of the intake device 200 in FIG. 5. The flap shaft 100 has a plurality of flaps (in the example, tumble flaps 52) which are retained on each side by a bearing mount 20 of the flap bearing arrangement 10.

What is claimed is:

1. A flap bearing arrangement, comprising:
   a bearing mount having two side parts, the two side parts spaced apart from each other;

a hollow tube section extending between and connecting the two side parts, a direction of extension of the tube section defining an axial direction;

an O-ring, formed as an annular ring of an elastomer, circumferentially surrounding the tube section, the O-ring arranged between the two side parts;

wherein the two side parts each have a substantially rectangular cross-section perpendicular to the hollow tube section extending between and connecting the two side parts;

wherein the two side parts each have a radially outer circumference, where radial relative to the tube section connecting the two side parts; and wherein in a circumferential direction around the annular ring of the O-ring, some radially outer circumferential sections of the O-ring project outwardly beyond the radially outer circumference of the of the side parts, while other radially outer circumferential sections of the O-ring do not project radially outwardly beyond the radially outer circumference of the of the side parts;

wherein each of the two side parts has:
- a cylinder support formed as a hollow cylinder, formed at and lying against an axially outer surface of the side part and concentric with the hollow tube section;
- wherein the hollow tube section is a single continuous hollow tube which extends continuously through both of the two side parts and through their cylinder supports and through the O-ring.

2. The flap bearing arrangement according to claim 1, wherein
the O-ring projects radially outwardly beyond the outer circumference of the two side parts by no more than 50% of an outer diameter of the O-ring.

3. The flap bearing arrangement according to claim 1, wherein
the bearing mount is formed from polyphenylene sulfide.

4. A flap shaft assembly, comprising:
an elongated flap shaft, wherein a direction of elongation of the flap shaft defines an axial direction;
a plurality of flap bearing arrangements, each including:
two side parts, the two side parts spaced apart from each other;
a hollow tube section extending between and connecting the two side parts, the tube section extending in the axial direction;
an O-ring, formed as an annular ring of an elastomer, circumferentially surrounding the tube section, the O-ring arranged between the two side parts;
wherein the two side parts each have a substantially rectangular cross-section perpendicular to the hollow tube section extending between and connecting the two side parts;
wherein the two side parts each have a radially outer circumference, where radial relative to the tube section connecting the two side parts; and
wherein in a circumferential direction around the annular ring of the O-ring, some radially outer circumferential sections of the O-ring project outwardly beyond the radially outer circumference of the of the side parts, while other radially outer circumferential sections of the O-ring do not project radially outwardly beyond the radially outer circumference of the of the side parts; and
wherein each of the two side parts has:
a cylinder support formed as a hollow cylinder, formed at and lying against an axially outer surface of the side part and concentric with the hollow tube section;
wherein the hollow tube section is a single continuous hollow tube which extends continuously through both of the two side parts and through their cylinder supports and through the O-ring; and
wherein each of the plurality of flap bearing arrangements are spaced apart axially on the elongated flap shaft.

5. An air intake device for an internal combustion engine, the air intake device comprising:
a flap shaft assembly according to claim 4.

6. The air intake device according to claim 5, wherein
the flap shaft assembly is arranged between an upper part and a lower part of the air intake device; and
wherein the upper and lower parts are securely welded to each other.

* * * * *